(12) United States Patent
Ohta et al.

(10) Patent No.: US 11,529,557 B2
(45) Date of Patent: Dec. 20, 2022

(54) METHOD AND INFORMATION PROCESSING DEVICE

(71) Applicant: TOYOTA JIDOSHA KABUSHIKI KAISHA, Aichi-ken (JP)

(72) Inventors: Ikuo Ohta, Toyota (JP); Kentaro Ban, Susono (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 17/386,553

(22) Filed: Jul. 28, 2021

(65) Prior Publication Data

US 2022/0152477 A1 May 19, 2022

(30) Foreign Application Priority Data

Nov. 18, 2020 (JP) .............................. JP2020-192027

(51) Int. Cl.
| | |
|---|---|
| *A63F 13/00* | (2014.01) |
| *A63F 9/24* | (2006.01) |
| *A63F 13/216* | (2014.01) |
| *A63F 13/79* | (2014.01) |
| *G06Q 50/06* | (2012.01) |
| *A63F 13/88* | (2014.01) |

(52) U.S. Cl.
CPC ............ *A63F 13/216* (2014.09); *A63F 13/79* (2014.09); *A63F 13/88* (2014.09); *G06Q 50/06* (2013.01); *A63F 2300/5553* (2013.01); *A63F 2300/8082* (2013.01)

(58) Field of Classification Search
CPC ........ A63F 13/216; A63F 13/79; A63F 13/88; A63F 2300/5553; A63F 2300/8082; G06Q 50/06
See application file for complete search history.

(56) References Cited

U.S. PATENT DOCUMENTS

| | | | | |
|---|---|---|---|---|
| 8,282,491 | B2* | 10/2012 | Auterio | A63F 13/216 |
| | | | | 705/14.12 |
| 8,287,383 | B1* | 10/2012 | Etter | A63F 13/87 |
| | | | | 463/42 |
| 8,556,719 | B1* | 10/2013 | Mahajan | A63F 13/822 |
| | | | | 463/40 |
| 8,608,570 | B1* | 12/2013 | Mahajan | A63F 13/85 |
| | | | | 463/2 |
| 9,802,127 | B2* | 10/2017 | Rouille | A63F 13/216 |
| 10,717,005 | B2* | 7/2020 | Kornmann | G07F 17/3227 |
| 11,179,627 | B2* | 11/2021 | Piccionelli | G07F 17/3211 |
| 2003/0104824 | A1* | 6/2003 | Hale | H04M 1/72457 |
| | | | | 455/456.1 |

(Continued)

FOREIGN PATENT DOCUMENTS

JP 4789222 B2 10/2011

*Primary Examiner* — Milap Shah
*Assistant Examiner* — Jason Pinheiro
(74) *Attorney, Agent, or Firm* — Hauptman Ham, LLP

(57) ABSTRACT

A method executed by an information processing device includes setting a virtual space of which positional information is linked with that of a real space, setting a game event in the virtual space in association with a location in the virtual space corresponding to positional information of a predetermined facility in the real space, acquiring a prediction value of an electric power demand in a target area in the real space, and starting the game event based on the prediction value.

20 Claims, 5 Drawing Sheets

(56) References Cited

U.S. PATENT DOCUMENTS

| | | | |
|---|---|---|---|
| 2006/0046823 A1* | 3/2006 | Kaminkow | G07F 17/3211 463/16 |
| 2007/0021166 A1* | 1/2007 | Mattila | A63F 13/12 463/1 |
| 2008/0039194 A1* | 2/2008 | Walther | G07F 17/32 463/25 |
| 2010/0120494 A1* | 5/2010 | DeWaal | G07F 17/3227 463/20 |
| 2010/0137047 A1* | 6/2010 | Englman | G07F 17/3244 463/31 |
| 2010/0137056 A1* | 6/2010 | Hoffman | G07F 17/32 463/43 |
| 2011/0117982 A1* | 5/2011 | Nguyen | G07F 17/3211 463/16 |
| 2012/0040692 A1 | 2/2012 | Baba | |
| 2012/0184351 A1* | 7/2012 | Hornik | G07F 17/3274 463/25 |

\* cited by examiner

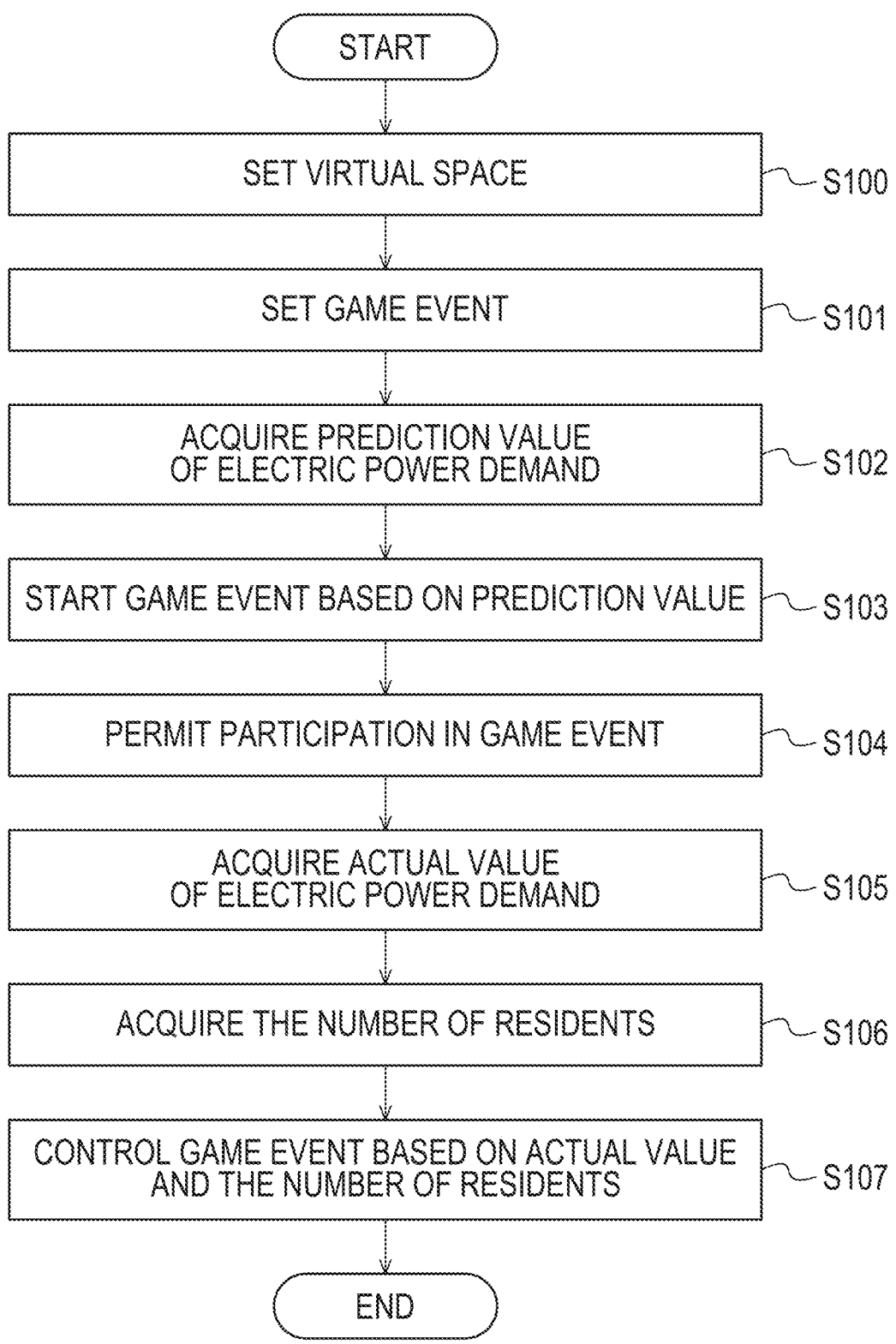

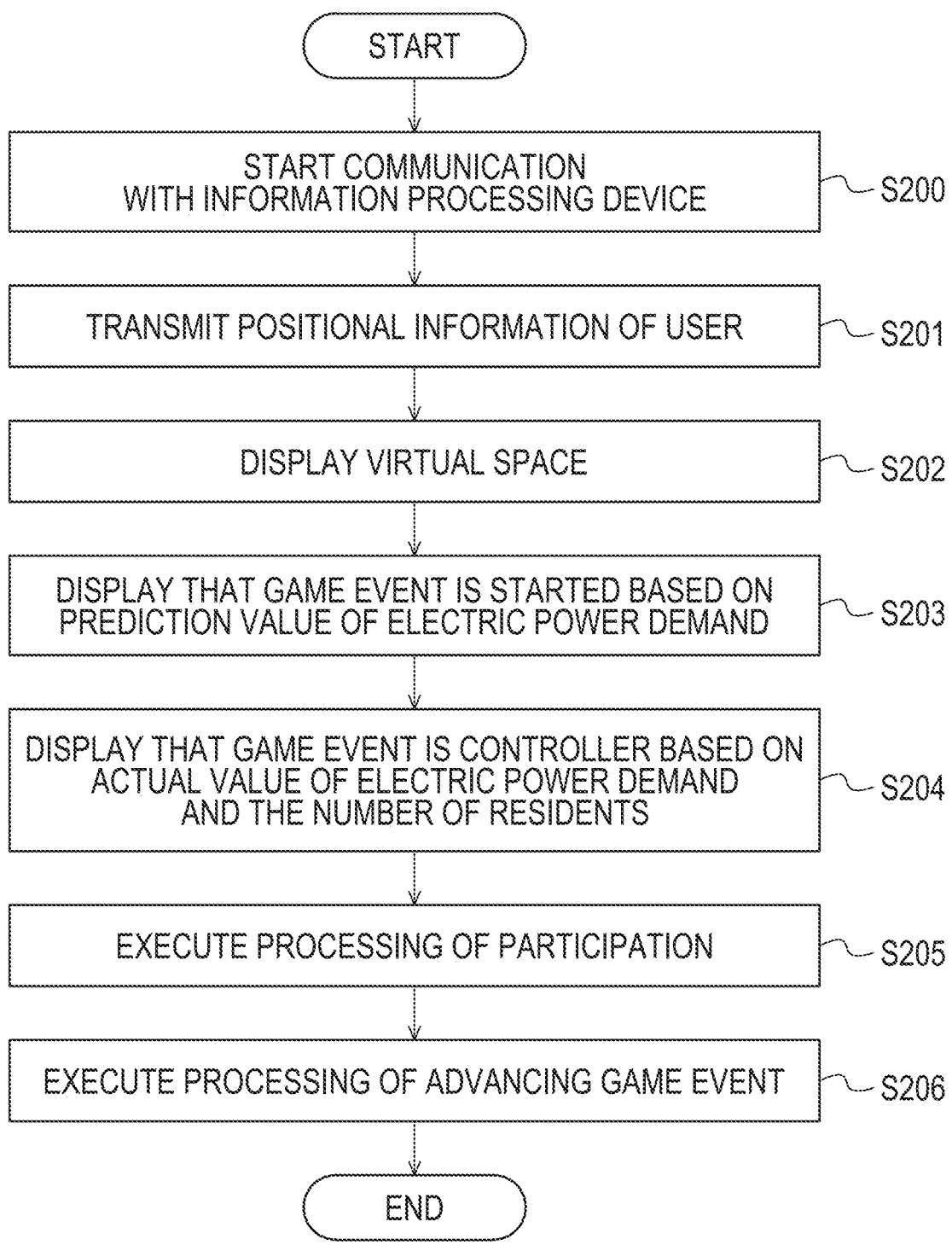

METHOD AND INFORMATION PROCESSING DEVICE

CROSS-REFERENCE TO RELATED APPLICATION

This application claims priority to Japanese Patent Application No. 2020-192027 filed on Nov. 18, 2020, incorporated herein by reference in its entirety.

BACKGROUND

1. Technical Field

The present disclosure relates to a method and an information processing device.

2. Description of Related Art

In the related art, a technique of providing a game by using positional information of a user is known. For example, Japanese Patent No. 4789222 (JP 4789222 B) discloses that points are given in accordance with a movement distance of the user who owns a mobile phone terminal.

SUMMARY

It is desired to improve the technique of providing the game by using the positional information of the user.

The present disclosure is to improve the technique of providing the game by using the positional information of the user.

A first aspect of the present disclosure relates to a method executed by an information processing device. The method includes setting a virtual space of which positional information is linked with that of a real space, setting a game event in the virtual space in association with a location in the virtual space corresponding to positional information of a predetermined facility in the real space, acquiring a prediction value of an electric power demand in a target area in the real space, and starting the game event based on the prediction value.

A second aspect of the present disclosure relates to an information processing device including a controller. The controller is configured to set a virtual space of which positional information is linked with that of a real space, set a game event in the virtual space in association with a location in the virtual space corresponding to positional information of a predetermined facility in the real space, acquire a prediction value of an electric power demand in a target area in the real space, and start the game event based on the prediction value.

A third aspect of the present disclosure relates to a method executed by a terminal device used by a user. The method includes starting communication with an information processing device, transmitting positional information of the user to the information processing device, displaying a virtual space of which positional information is linked with that of a real space, and displaying that a game event in the virtual space is started based on a prediction value of an electric power demand in a target area in the real space. The game event is a game event set in association with a location in the virtual space corresponding positional information of a predetermined facility in the real space.

According to the aspects of the present disclosure, the technique of providing the game by using the positional information of the user is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart showing an operation of the information processing device; and FIG. 6 is a flowchart showing an operation of the terminal device.

DETAILED DESCRIPTION OF EMBODIMENTS

Hereinafter, an embodiment of the present disclosure will be described with reference to the drawings.

Outline of Embodiment

Figure 1:
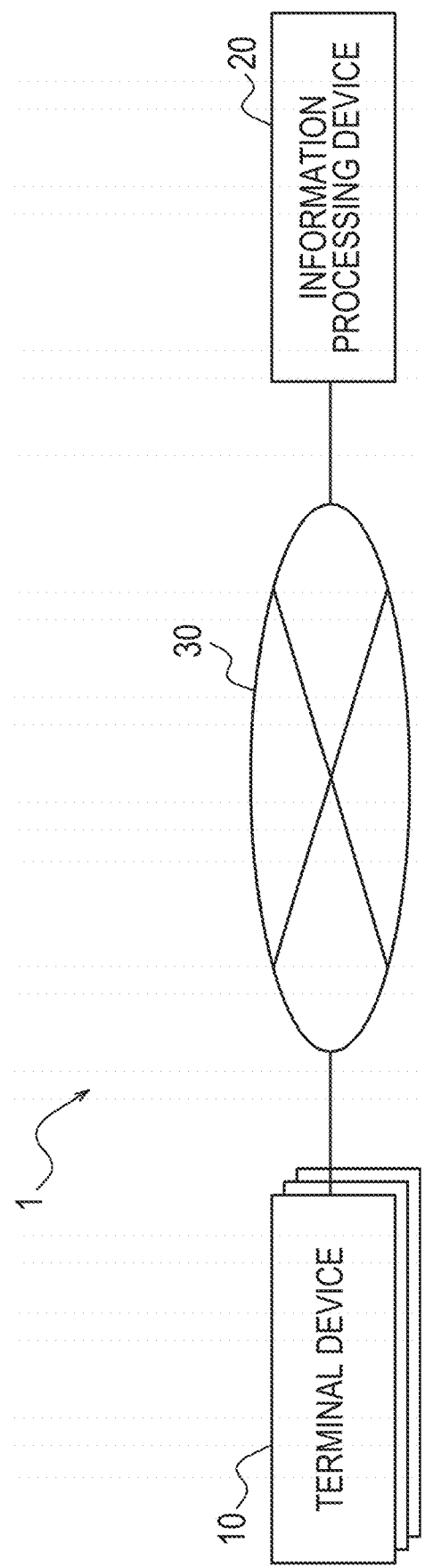
FIG. 1 is a block diagram showing a schematic configuration of a system according to an embodiment of the present disclosure.

An outline of a system 1 according to the embodiment of the present disclosure will be described with reference to FIG. 1. The system 1 includes one or more terminal devices 10 and an information processing device 20.

The terminal device 10 and the information processing device 20 are communicably connected to a network 30 that includes, for example, a mobile communication network and the Internet. The terminal device 10 is, for example, a smartphone, a tablet terminal, or a portable game machine, but is not limited to this, and may be any computer capable of being owned by a user. The information processing device 20 is, for example, a server device, but is not limited to this, and may be any computer. The information processing device 20 provides a game to, for example, the terminal device 10 that executes an application program of the game. The application program of the game may be downloaded to the terminal device 10 from, for example, an application distribution server via the network 30, or may be installed at the time of manufacturing the terminal device 10.

The user of the terminal device 10 plays the game by using a user account. The "user account" includes information for uniquely identifying the user in the game. The user account may be created, for example, when the user plays the game for the first time. The user can play the game by any terminal device 10 by using user's own user account by implementing authentication processing, such as password input. Note that the user may omit the implementation of the authentication processing. Information peculiar to the user in the game is managed in association with the user account. The information peculiar to the user in the game includes information of, for example, a virtual object, such as a character, an item, a currency, a point, a title, or authority owned by the user in the game, a game play history, and an address of the user in the real space, but is not limited to these.

Figure 2:
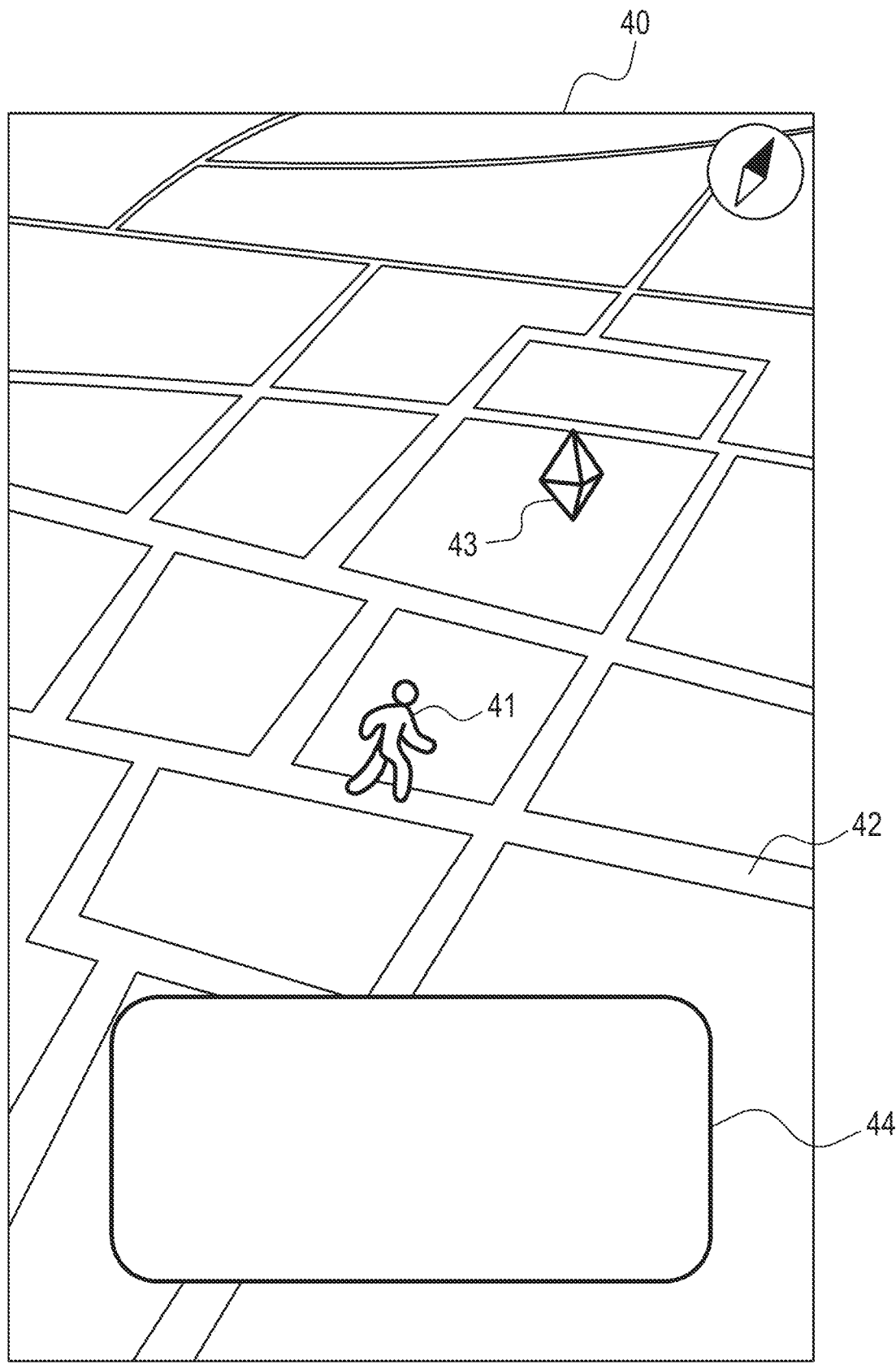
FIG. 2 is a diagram showing an example of a game screen displayed on a terminal device.

In the game according to the present embodiment, a virtual space of which positional information is linked with that of the real space is used. During execution of the application program of the game, the terminal device 10 displays a game screen 40 showing at least a part of the virtual space, for example, as shown in FIG. 2. The virtual space may be a two-dimensional space, or may be a three-dimensional space. The game screen 40 includes an avatar 41, a virtual road 42, a virtual facility 43, and a notice region 44.

The avatar 41 is a character in the virtual space that is an alter ego of the user who plays the game. In the present embodiment, positional information of the user in the real space is linked with positional information of the avatar 41 in the virtual space. Accordingly, when the user moves in the real space, the avatar 41 also moves in the virtual space. In a case where the user wants to cause the avatar 41 to move to a desired location in the virtual space, the user needs to actually move to a location in the real space corresponding to the location in the virtual space.

The virtual road 42 is a road that is present in the virtual space. In the present embodiment, positional information of the road that is present in the real space and positional information of the virtual road 42 in the virtual space have a correspondence relationship. Therefore, the disposition of the road in the real space and the disposition of the virtual road 42 in the virtual space can substantially coincide with each other. For example, in a case where the user is positioned on a certain road in the real space, the avatar 41 is positioned on the virtual road 42 in the virtual space corresponding to the road in the real space.

The virtual facility 43 is a facility that is present in the virtual space. In the present embodiment, positional information of the facility that is present in the real space and positional information of the virtual facility 43 in the virtual space have a correspondence relationship. Therefore, the disposition of the facility in the real space and the disposition of the virtual facility 43 in the virtual space can substantially coincide with each other. For example, in a case where the user is positioned in a certain facility in the real space, the avatar 41 is positioned in the virtual facility 43 in the virtual space corresponding to the facility in the real space.

The notice region 44 is a region in which any information notified to the user who plays the game is displayed. For example, information, such as a text, a still image, or a moving image can be displayed in the notice region 44. The notice region 44 may be always displayed, for example, on the game screen 40 or may be displayed when the information is notified to the user.

In the present embodiment, any game event associated with any location in the virtual space can be implemented. The user can participate in the game event by causing the avatar 41 to move to the location in the virtual space, for example. The content of the game event is, for example, a mini-game for playing against an enemy character or a mini-game for acquiring a virtual object, such as an item or a character, but is not limited to these, and may be optionally determined.

First, the outline of the present embodiment will be described, and the details will be described below. The information processing device 20 sets the virtual space of which the positional information is linked with that of the real space. The information processing device 20 sets the game event in the virtual space in association with a location in the virtual space (for example, the virtual facility 43) corresponding to the positional information of a predetermined facility in the real space. The information processing device 20 acquires a prediction value of an electric power demand in a target area in the real space. Then, the information processing device 20 starts the game event based on the acquired prediction value.

As described above, according to the present embodiment, the game event is started based on the prediction value of the electric power demand in the target area in the real space. For example, a case is conceivable in which the game event is started when an increase in the electric power demand in the target area is expected, such as when the prediction value of the electric power demand exceeds a predetermined reference value. In such a case, a resident of the target area can be motivated to actually move from the target area to the facility for the purpose of participating in the game event. As the resident moves from the target area, the electric power demand in each dwelling unit in the target area can be decreased. Therefore, the technique of providing the game by using the positional information of the user is improved in that the increase in the electric power demand in the entire target area can be mitigated or suppressed.

Hereinbelow, each configuration of the system 1 will be described in detail.

Configuration of Terminal Device

Figure 3:
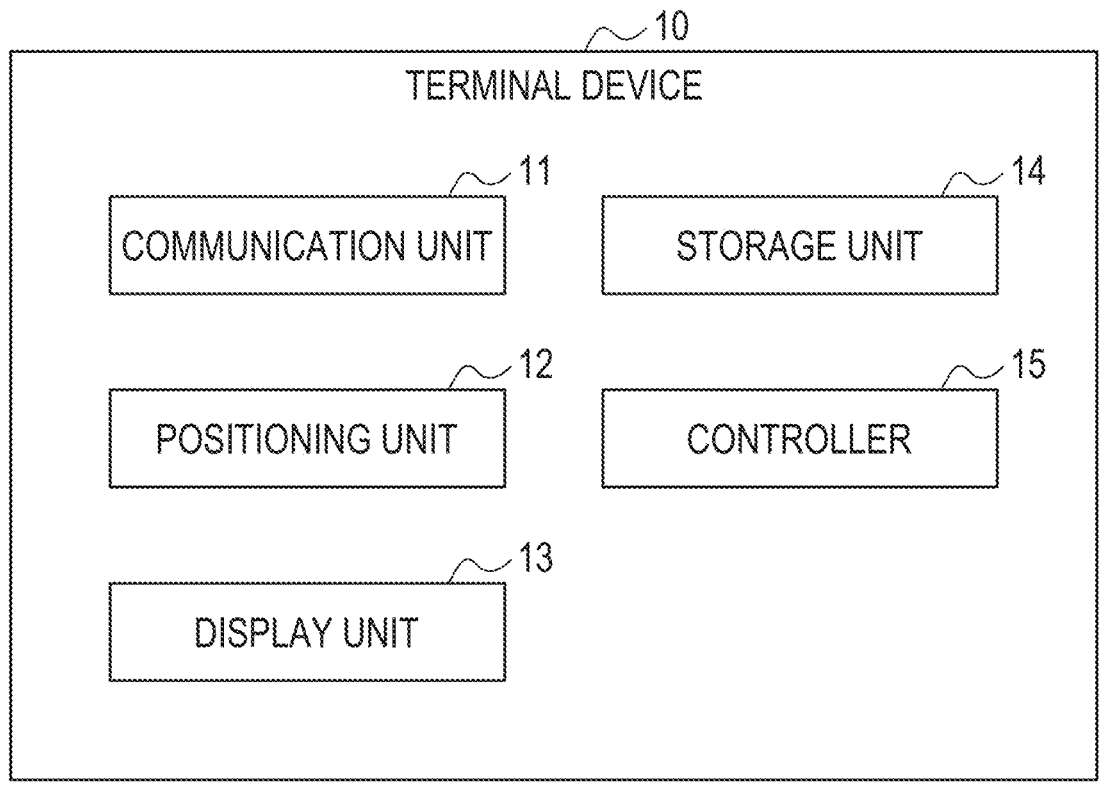
FIG. 3 is a block diagram showing a schematic configuration of the terminal device.

The terminal device 10 includes a communication unit 11, a positioning unit 12, a display unit 13, a storage unit 14, and a controller 15, as shown in FIG. 3.

The communication unit 11 includes one or more communication interfaces that are connected to the network 30. The communication interface supports, for example, a mobile communication standard, such as 4th generation (4G) and 5th generation (5G), but is not limited to these, and may support any communication standard. In the present embodiment, the terminal device 10 communicates with the information processing device 20 via the communication unit 11.

The positioning unit 12 includes a receiver corresponding to a satellite positioning system. The receiver corresponds to, for example, a global positioning system (GPS), but is not limited to this, and may correspond to any satellite positioning system. Further, the positioning unit 12 may include, for example, a gyro sensor, a geomagnetic sensor, and an atmospheric pressure sensor. In the present embodiment, the terminal device 10 uses the positioning unit 12 to acquire the positional information of the user and a direction in which the user faces. The positional information may include two-dimensional coordinate data that includes latitude and longitude, and may include three-dimensional coordinate data that includes altitude in addition to latitude and longitude.

The display unit 13 includes one or more displays. Each of the displays may include an input interface, such as a touch screen.

The storage unit 14 includes one or more memories. In the present embodiment, the "memory" is, for example, a semiconductor memory, a magnetic memory, or an optical memory, but is not limited to these. Each of the memories included in the storage unit 14 may function as, for example, a main storage device, an auxiliary storage device, or a cache memory. The storage unit 14 stores any information used for the operation of the terminal device 10. For example, the storage unit 14 may store a system program and an application program. In the present embodiment, the storage unit 14 stores the application program of the game described above and any information used in the game. The information used in the game includes, for example, information of the user account and the information peculiar to the user managed in association with the user account (for example, information, such as the virtual object owned by the user in the game, the game play history, and the address of the user in the real space), but is not limited to these. The information stored in the storage unit 14 may be updatable by the information acquired from the network 30 via the communication unit 11, for example.

The controller 15 includes one or more processors, one or more programmable circuits, one or more dedicated circuits, or a combination thereof. The processor is, for example, a general-purpose processor, such as a central processing unit (CPU) or a graphics processing unit (GPU), or a dedicated processor specialized for specific processing, but is not limited to these. The programmable circuit is, for example, a field-programmable gate array (FPGA), but is not limited to this. The dedicated circuit is, for example, an application specific integrated circuit (ASIC), but is not limited to this. The controller 15 controls the operation of the entire terminal device 10. For example, the controller 15 executes the application program of the game stored in the storage unit 14. Details of the operation of the terminal device 10 controlled by the controller 15 will be described below.

Configuration of Information Processing Device

Figure 4:
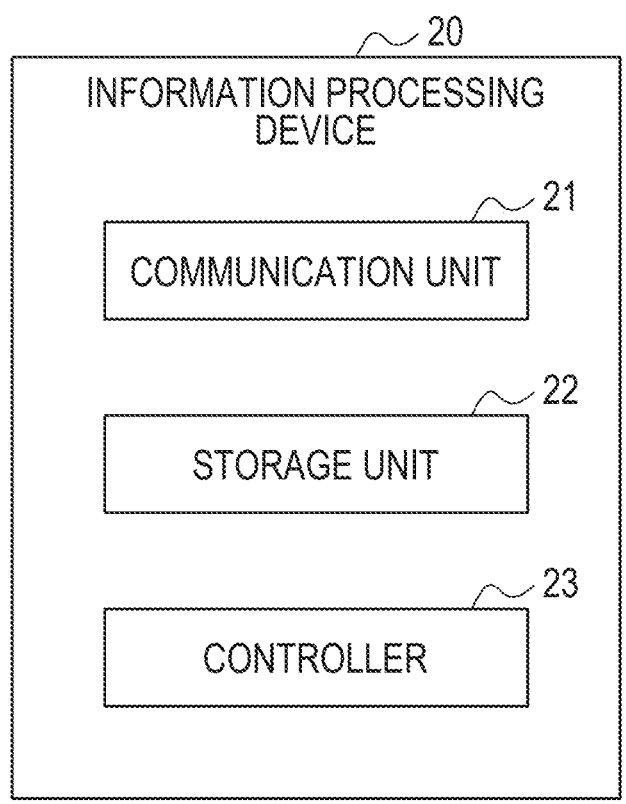
FIG. 4 is a block diagram showing a schematic configuration of an information processing device.

The information processing device 20 includes a communication unit 21, a storage unit 22, and a controller 23, as shown in FIG. 4.

The communication unit 21 includes one or more communication interfaces that are connected to the network 30. The communication interface supports, for example, a mobile communication standard, a wired local area network (LAN) standard, or a wireless LAN standard, but is not limited to these, and may support any communication standard. In the present embodiment, the information processing device 20 communicates with the terminal device 10 via the communication unit 21.

The storage unit 22 includes one or more memories. Each of the memories of the storage unit 22 may function as, for example, a main storage device, an auxiliary storage device, or a cache memory. The storage unit 22 stores any information used for the operation of the information processing device 20. For example, the storage unit 22 may store the system program, the application program, a database, and map information. In the present embodiment, the storage unit 22 stores any information used in the game. The information used in the game includes, for example, information of the user account and the information peculiar to the user managed in association with the user account (for example, information, such as the virtual object owned by the user in the game, the game play history, and the address of the user in the real space), but is not limited to these. The information stored in the storage unit 22 may be updatable by the information acquired from the network 30 via the communication unit 21, for example.

The controller 23 includes one or more processors, one or more programmable circuits, one or more dedicated circuits, or a combination thereof. The controller 23 controls the operation of the entire information processing device 20. Details of the operation of the information processing device 20 controlled by the controller 23 will be described below.

Operation Flow of Information Processing Device

An operation flow of the information processing device 20 will be described with reference to FIG. 5.

Step S100: The controller 23 of the information processing device 20 sets the virtual space of which the positional information is linked with that of the real space.

Specifically, the controller 23 configures the virtual space used in the game, and disposes the avatar 41 of the user who plays the game in the virtual space. Here, the controller 23 links the positional information of the user received from the terminal device 10 with the positional information of the avatar 41 of the user.

Step S101: The controller 23 sets the game event in the virtual space in association with a location in the virtual space (for example, the virtual facility 43 shown in FIG. 2) corresponding to the positional information of the predetermined facility in the real space. The predetermined facility is a facility having a large seating capacity as compared with a general residence, such as a shopping mall or a library, but is not limited to this, and may be any facility.

Step S102: The controller 23 acquires the prediction value of the electric power demand in the target area in the real space.

Here, the target area is any area determined to include, for example, one or more residences. The controller 23 may receive the prediction value of the electric power demand in the target area from, for example, a server managed by an electric power company, or may calculate a future prediction value from a past actual value of the target area.

Step S103: The controller 23 starts the game event based on the prediction value acquired in step S102.

In the present embodiment, the controller 23 starts the game event when the prediction value of the electric power demand in the target area is equal to or more than a threshold value. However, the controller 23 may start the game event, for example, when the prediction value of the electric power demand in the target area is less than the threshold value.

Step S104: The controller 23 permits the user account of the resident of the target area who is present in the predetermined facility in the real space to participate in the game event.

Specifically, the controller 23 determines whether or not the user is the resident of the target area based on the information associated with the user account (for example, the information of the address of the user in the real space). When the controller 23 determines that the user is the resident of the target area, in a case where the positional information of the user substantially coincides with the positional information of the predetermined facility, the controller 23 permits the user account of the user to participate in the game event. On the other hand, in a case where the positional information of the user does not substantially coincide with the positional information of the predetermined facility, or in a case where the controller 23 determines that the user is not the resident of the target area, the controller 23 may not permit the user account of the user to participate in the game event.

Here, the controller 23 may cause the user account that is permitted to participate in the game event to immediately participate in the game event, or may cause the user account to participate in the game event in accordance with a request from the user of the user account.

Step S105: The controller 23 acquires an actual value of the electric power demand in the target area in the real space. Here, the actual value of the electric power demand in the target area may be received from, for example, the server managed by the electric power company.

Step S106: The controller 23 acquires the number of residents of the target area who are present in the predetermined facility in the real space.

Specifically, the controller 23 acquires the number of users of which current positional information substantially coincides with the positional information of the predetermined facility among a plurality of the users of the residents of the target area.

Step S107: The controller 23 controls the game event based on at least one of the actual value acquired in step S105 and the number of residents acquired in step S106.

Specifically, when the actual value is less than the threshold value or the number of residents is equal to or more than the threshold value during implementation of the game event, the controller 23 may control the game event such that an incentive is given to the user account that participates in the game event or parameters related to the game event are changed. The parameters related to the game event are, for example, an implementation period of the game event, an acquisition probability of the character that the user account can acquire by participating in the game event, and a level at the time of acquisition of the character, but are not limited to these, and may be any parameter. Here, the controller 23 may change the parameters related to the game event such that the user of the user account that participates in the game event has an advantage. For example, the controller 23 can extend the implementation period of the game event, increase the acquisition probability of the character that the user account can acquire by participating in the game event, or increase the level at the time of acquisition of the character.

Alternatively, when the actual value is equal to or more than the threshold value or the number of residents is less than the threshold value during implementation of the game event, the controller 23 may control the game event to change the parameters related to the game event. In this case, the controller 23 may change the parameters related to the game event such that the user of the user account that participates in the game event has a disadvantage. For example, the controller 23 can shorten the implementation period of the game event, decrease the acquisition probability of the character that the user account can acquire by participating in the game event, or decrease the level at the time of acquisition of the character.

Operation Flow of Terminal Device

An operation flow of the terminal device 10 that executes the application program of the game will be described with reference to FIG. 6.

Step S200: The controller 15 of the terminal device 10 starts communication with the information processing device 20 via the communication unit 11.

Step S201: The controller 15 transmits the positional information of the user acquired by using the positioning unit 12 to the information processing device 20 via the communication unit 11. The transmission of positional information is, for example, periodically and repeatedly implemented.

Step S202: The controller 15 displays, on the display unit 13, the virtual space of which the positional information is linked with that of the real space. For example, the game screen 40 shown in FIG. 2 is displayed on the display unit 13.

Step S203: The controller 15 displays, on the display unit 13, that the game event in the virtual space is started based on the prediction value of the electric power demand in the target area in the real space.

Specifically, the controller 15 may display, in the notice region 44 of the game screen 40, a message indicating that the game event is started when the prediction value of the electric power demand in the target area is equal to or more than the threshold value. Here, the controller 15 may acquire the prediction value from the information processing device 20 and display the message when the prediction value is equal to or more than the threshold value.

Step S204: The controller 15 displays, on the display unit 13, that the game event in the virtual space is controlled based on at least one of the actual value of the electric power demand in the target area in the real space and the number of residents of the target area who are present in the predetermined facility in the real space.

Specifically, when the actual value is less than the threshold value or the number of residents is equal to or more than the threshold value during implementation of the game event, the controller 15 may display, in the notice region 44 of the game screen 40, a message indicating that the game event is controlled such that the incentive is given to the user account that participates in the game event or the parameters related to the game event are changed. Here, the controller 15 may acquire the actual value or the number of residents from the information processing device 20, and display the message when the actual value is less than the threshold value or the number of residents is equal to or more than the threshold value.

Step S205: In a case where the user is the resident of the target area, when the user moves from the target area to the predetermined facility during implementation of the game event, the controller 15 executes processing of causing the user account of the user to participate in the game event.

Specifically, the controller 15 transmits, for example, a request for the user account to participate in the game event to the information processing device 20 in accordance with a user operation or automatically. In accordance with the request, the information processing device 20 causes the user account to participate in the game event.

Step S206: When the user account of the user participates in the game event, the controller 15 executes processing of advancing the game event.

Specifically, the controller 15 transmits, for example, a request for advancing the game event to the information processing device 20 in accordance with the user operation or automatically. In accordance with the request, the information processing device 20 advances the game event for the user account.

As described above, the information processing device 20 according to the present embodiment sets the virtual space of which the positional information is linked with that of the real space. The information processing device 20 sets the game event in the virtual space in association with a location in the virtual space (for example, the virtual facility 43) corresponding to the positional information of the predetermined facility in the real space. The information processing device 20 acquires the prediction value of the electric power demand in the target area in the real space. Then, the information processing device 20 starts the game event based on the acquired prediction value.

According to such a configuration, the game event is started based on the prediction value of the electric power demand in the target area in the real space. For example, a case is conceivable in which the game event is started when an increase in the electric power demand in the target area is expected, such as when the prediction value of the electric power demand exceeds a predetermined reference value. In such a case, a resident of the target area can be motivated to actually move from the target area to the facility for the purpose of participating in the game event. As the resident moves from the target area, the electric power demand in each dwelling unit in the target area can be decreased. Therefore, the technique of providing the game by using the positional information of the user is improved in that the increase in the electric power demand in the entire target area can be mitigated or suppressed.

Although the present disclosure has been described based on the drawings and the embodiments, it should be noted that those skilled in the art may make various modifications and variations based on the present disclosure. Therefore, it should be noted that these modifications and variations are included in the scope of the present disclosure. For example, the functions and the like included in each configuration unit or each step can be rearranged not to logically contradict, and a plurality of configuration units or steps can be combined or divided into one.

For example, an embodiment in which the terminal device 10 executes a part or all of the operations executed by the information processing device 20 in the embodiment described above can be adopted. Further, the operations executed by the information processing device 20 may be distributed and executed by a plurality of computers that can communicate with each other.

Further, for example, an embodiment in which a general-purpose computer is caused to function as the terminal device 10 or the information processing device 20 according to the embodiment described above can be adopted. Specifically, a program recording the processing content for realizing each function of the terminal device 10 or the information processing device 20 according to the embodiment described above is stored in the memory of the computer, and the program of the computer is read and executed by the processor of the electronic device. Accordingly, the present disclosure according to the present embodiment can also be realized as a program that can be executed by a processor or a non-transitory computer-readable medium that stores the program.

What is claimed is:

1. A method executed by an information processing device, the method comprising:
    setting a computer-generated virtual space of which positional information is linked with that of a real space;
    setting a game event in the computer-generated virtual space in association with a location in the computer-generated virtual space corresponding to positional information of a predetermined facility in the real space;
    determining a target area in the real space, the target area including one or more residents,
    acquiring, from a server managed by an electric power provider, a prediction value of an electric power demand in the target area in the real space; and
    based on the prediction value, starting the game event for the one or more residents of the target area to participate in the predetermined facility in the real space.

2. The method according to claim 1, wherein the information processing device starts the game event in response to the prediction value being equal to or more than a threshold value.

3. The method according to claim 1, further comprising permitting a user account of a resident of the one or more residents of the target area who is present in the predetermined facility in the real space to participate in the game event during implementation of the game event.

4. The method according to claim 1, further comprising:
    acquiring, from the server managed by the electric power provider, an actual value of the electric power demand in the target area in the real space; and
    controlling the game event based on the actual value.

5. The method according to claim 4, further comprising:
    controlling the game event such that, in response to the actual value being less than a threshold value during implementation of the game event,
        an incentive is given to a user account that participates in the game event, or
        a parameter related to the game event is changed.

6. The method according to claim 1, further comprising:
    acquiring the number of the one or more residents of the target area who are present in the predetermined facility in the real space; and
    controlling the game event based on the number of the one or more residents.

7. The method according to claim 6, further comprising:
    controlling the game event such that, in response to the number of the one or more residents being equal to or more than a threshold value during implementation of the game event,
        an incentive is given to a user account that participates in the game event, or
        a parameter related to the game event is changed.

8. An information processing device comprising a controller, wherein the controller is configured to
    set a computer-generated virtual space of which positional information is linked with that of a real space,
    set a game event in the computer-generated virtual space in association with a location in the computer-generated virtual space corresponding to positional information of a predetermined facility in the real space,
    determine a target area in the real space, the target area including one or more residents,
    acquire, from a server managed by an electric power provider, a prediction value of an electric power demand in the target area in the real space, and
    based on the prediction value, start the game event for the one or more residents of the target area to participate in the predetermined facility in the real space.

9. The information processing device according to claim 8, wherein the controller is configured to, in response to the prediction value being equal to or more than a threshold value, start the game event.

10. The information processing device according to claim 8, wherein the controller is configured to permit a user account of a resident of one or more residents of the target area who is present in the predetermined facility in the real space to participate in the game event during implementation of the game event.

11. The information processing device according to claim 8, wherein the controller is configured to
    acquire, from the server managed by the electric power provider, an actual value of the electric power demand in the target area in the real space, and
    control the game event based on the actual value.

12. The information processing device according to claim 11, wherein the controller is configured to, in response to the actual value being less than a threshold value during implementation of the game event, control the game event such that
    an incentive is given to a user account that participates in the game event, or
    a parameter related to the game event is changed.

13. The information processing device according to claim 8, wherein the controller is configured to
    acquire the number of the one or more residents of the target area who are present in the predetermined facility in the real space, and
    control the game event based on the number of the one or more residents.

14. The information processing device according to claim 13, wherein the controller is configured to, in response to the number of the one or more residents being equal to or more than a threshold value during implementation of the game event, control the game event such that
    an incentive to a user account that participates in the game event is given, or
    a parameter related to the game event is changed.

15. A method executed by a terminal device used by a user, the method comprising:
    starting communication with an information processing device;
    transmitting positional information of the user to the information processing device;
    displaying a computer-generated virtual space of which positional information is linked with that of a real space; and
    displaying that a game event in the computer-generated virtual space is started based on a prediction value of an electric power demand in a target area in the real space, the target area including one or more residents,
    wherein the game event is set in association with a location in the computer-generated virtual space corresponding positional information of a predetermined facility in the real space, the game event being set for the one or more residents of the target area to participate in the predetermined facility in the real space, and
    wherein the prediction value of the electric power demand in the target area in the real space is acquired from a server managed by an electric power provider.

16. The method according to claim 15, wherein in response to the prediction value being equal to or more than a threshold value, the game event is started.

17. The method according to claim 15, further comprising:
    executing, in a case where the user is a resident of the one or more residents of the target area, in response to the user moving from the target area to the predetermined facility during implementation of the game event, processing of causing a user account of the user to participate in the game event; and
    executing, in response to the user account participating in the game event, processing of advancing the game event.

18. The method according to claim 15, further comprising: displaying that the game event is controlled based on
    an actual value of the electric power demand in the target area in the real space or
    the number of the one or more residents of the target area who are present in the predetermined facility in the real space.

19. The method according to claim 18, wherein in response to the actual value being less than a threshold value during implementation of the game event, the game event is controlled such that
    an incentive is given to a user account that participates in the game event, or
    a parameter related to the game event is changed.

20. The method according to claim 18, wherein in response to the number of the one or more residents being equal to or more than a threshold value during implementation of the game event, the game event is controlled such that
    an incentive is given to a user account that participates in the game event, or
    a parameter related to the game event is changed.

* * * * *